United States Patent Office 2,694,722
Patented Nov. 16, 1954

2,694,722

PREPARATION OF ALKYL HYPOCHLORITES

Irving Katz, Long Beach, Calif., assignor to Bjorksten Research Laboratories, Inc., a corporation of Illinois No Drawing. Application December 13, 1952,
Serial No. 325,877

10 Claims. (Cl. 260—453)

This invention relates to a new and novel method of preparing alkyl hypochlorites.

Heretofore, the prepartaion of alkyl hypochlorites has generally followed the method of Sandmeyer which consists of treating an aqueous solution of sodium hydroxide and an alcohol with chlorine. The organic hypochlorite floats to the surface of the mixture. The following formula is believed to represent the preparation:

$$Cl_2 + NaOH + ROH \rightarrow NaCl + ROCl + H_2O$$

where R represents that part of the organic molecule not entering into the reaction. In this method free chlorine is required which necessitates the use of elaborate equipment both for the protection of the operators and the handling of the poisonous gas. Further, the excess chlorine promotes the rapid decomposition of the hypochlorites and in some cases leads to very violent explosions.

Another preparation uses 1 mole of alcohol to 2 moles of NaOH dissolved in water. Light is excluded and chlorine added until no more is absorbed. The hypochlorite floats to the surface where it is separated from the mixture and dried with anhydrous calcium chloride. This method has the same objectionable features as the original method.

Another preparation utilizes a limestone slurry which is chlorinated until a certain concentration of chlorine is obtained. This is shaken with a solution of carbon tetrachloride and alcohol. The hypochlorite is then removed. This method still requires the use of chlorine and with this the dangers are not removed. Further, the method is cumbersome, especially with respect to the other methods.

Another procedure utilizes the original method but modifies it by keeping the reactants at 0° C. and adding NaCl which helps the separation of the hypochlorite by increasing the density of the aqueous mixture. This method again does not prevent the difficulties involved with the use of free chlorine.

Another procedure makes use of a solution of alcohol and sodium hypochlorite to which acetic acid is added and from which the hypochlorite is removed. This method is only applicable to the preparation of tertiary hypochlorites which are stable and not to the primary and secondary hypochlorties which decompose very readily and with much violence.

Another procedure utilizes the original method but modifies it by washing the hypochlorite with a dilute solution of sodium bicarbonate which neutralizes the excess chlorine present as HCl. This method does not eliminate the necessity of protective equipment and further necessitates an additional step in the processing.

Still another method utilizes a suspension of calcium carbonate in water and tertiary butyl alcohol to which is added $Cl_2$ gas. The hypochlorite is removed at the end of the operation. Again, this method has the same difficulties as the others.

It is an object of this invention to provide a simple and safe method for preparing alkyl hypochlorites without the danger of explosion or rapid decomposition during the preparation.

Another object is to provide a procedure suitable for preparing alkyl hypochlorties without the use of gaseous chlorine which is extremely dangerous.

Still further objects will become apparent as the following detailed description proceeds.

The method of my invention consists broadly in taking an inorganic hypochlorite salt, such as sodium hypochlorite and an alcohol dissolved in water and of then adding carbon dioxide. Alkyl hypochlorite is produced which can then be removed by the conventional procedures known to the art. The above compounds are of course given as illustrations only.

The following chemical equation is believed to represent the reaction:

$$NaOCl + CO_2 + (CH_3)_3COH \rightarrow (CH_3)_3COCl + NaHCO_3$$

By an inorganic hypochlorite salt, I means the hypochlorite of any metal and preferably one of the hypochlorites of an alkali metal or alkaline earth metal such as sodium hypochlorite, potassium hypochlorite, calcium hypochlorite, barium hypochlorite and other salts such as these.

By an alcohol I mean a water soluble aliphatic alcohol which may be either primary, secondary or tertiary; such alcohols are generally those containing from 1 to 8 carbon atoms and include, for example, methyl alcohol, propyl alcohol, hexyl alcohol, octyl alcohol, isopropyl alcohol, secondary butyl alcohol, tertiary butyl alcohol, tertiary amyl alcohol. Alcohols containing more carbon atoms are relatively insoluble in water; two phases are formed and the reaction, if any, is very slow.

The ratio between the alcohol and the hypochlorite is preferably approximately stoichiometric since no useful object is gained by providing an excess of either reactant.

By carbon dioxide I mean gaseous $CO_2$, liquid $CO_2$ or solid $CO_2$, commonly known as Dry Ice.

Ordinary commercial laundry bleaches, which are usually standardized to 5.25% active chlorine as sodium hypochlorite, may be used for the inorganic hypochlorite salt in place of pure sodium hypochlorite. Solid $CO_2$ is useful in the preparation as in addition to providing $CO_2$ it also provides the cooling usually desired in preparing the primary and secondary hypochlorites.

Solvents can also be used in practising the process of my invention if the alkyl hypochlorite is desired in the form of a solution. Suitable solvents are those which will not react with the hypochlorites produced. Examples of such solvents are carbon tetrachloride, chloroform, benzol, and the like.

The temperature at which the reaction of my invention should generally be carried out is preferably between —10° C. and 24° C. but it may, however, be carried out at temperatures as high as 50° C. in some instances.

With the use of solid or liquid $CO_2$ no external cooling is necessary because the $CO_2$ in these states keeps the reaction mixture cool. An excess is usually found helpful. When using gaseous $CO_2$ external cooling ought to be supplied.

The pH of the reaction should be held to approximately 7.0 or in any event between 6.0 and 8.0. An acidic medium will enhance the decomposition of resulting hypochlorite. In the case of an acidic medium the following may occur:

$$2HA + 2ROCl \rightarrow Cl_2 + 2ROH \quad (A = anion)$$

whereupon the exothermic reaction produces the decomposition of remaining hypochlorite:

$$ROCl \rightarrow HCl + R'CHO$$
$$R'CHO + ROCl \rightarrow HCl + R'COOR$$

In a basic medium hydrolysis may occur.

The pH should be adjusted by adding a small amount of very weak acid or base prior to the use of the $CO_2$ and may require adjustment during the course of the reaction.

Sodium chloride may be added to the reaction mixture to the point of saturation. The sodium chloride increases the density of the water layer and thus aids in the separation of the organic hypochlorite by increasing the difference between its density and that of the water layer.

The following examples will illustrate further the process of the invention but in no way are intended to limit the scope of the invention.

*Example 1*

To an aqueous solution containing 90 grams of potassium hypochlorite is added 60 grams of n-propyl alcohol.

Sufficient water is added to keep the mixture homogeneous. Sodium chloride is added till the solution is saturated. The pH is adjusted to about 7. Powdered Dry Ice is added slowly to prevent separation of the alcohol. As the Dry Ice is added n-propyl hypochlorite floats to the surface. The hypochlorite has a definite yellow tint.

The hypochlorite is removed by conventional procedures.

Example 2

To an aqueous solution containing 74.5 grams of sodium hypochlorite is added 74 grams of tertiary butyl alcohol. Water is added to keep the mixture homogeneous. Sodium chloride is added till the solution is saturated. The pH is adjusted to about 7. Adequate cooling is provided to keep the temperature near 0° C. Gaseous $CO_2$ is permitted to enter slowly. Tertiary butyl hypochlorite floats to the surface and is removed by conventional procedures. The yield varies between 83 and 93% of the theoretical.

Example 3

An aqueous solution of equimolar portions of calcium hypochlorite and isopropyl alcohol is prepared; water is added to make the mixture homogeneous and sodium chloride is added until the solution is saturated; the pH is adjusted to about 7. Solid carbon dioxide is then added, the addition being made slowly to prevent separation of the alcohol; isopropyl hypochlorite goes to the surface and is removed by conventional procedures.

Example 4

An aqueous solution containing equimolar portions of barium hypochlorite and ethyl alcohol is prepared. Additional water may be added and sodium chloride may be added to the point of saturation; the pH is then adjusted to about 7. Finely crushed solid carbon dioxide is then added slowly with stirring. The reaction proceeds and ethyl hypochlorite goes to the surface and is removed by conventional procedures.

Since certain changes in carrying out the above process and certain modifications in the composition which embody the invention may be made without departing from its scope, it is intended that all matter contained in the description shall be interpreted as illustrative and not in any way as limiting.

Having thus disclosed my invention, I claim:

1. The method for preparing an alkylhypochlorite comprising reacting a metal hypochlorite and an aliphatic alcohol containing 1 to 8 carbon atoms with carbon dioxide in the presence of water and while maintaining a pH of between 6.0 and 8.0.

2. The method for preparing an alkylhypochlorite comprising reacting carbon dioxide in the presence of water with an aliphatic alcohol containing from 1 to 8 carbon atoms and a substance selected from the group consisting of the hypochlorites of alkali metals and alkaline earth metals while maintaining a pH of between 6.0 and 8.0.

3. The method for preparing an alkylhypochlorite comprising introducing carbon dioxide into an aqueous solution containing an aliphatic alcohol containing from 1 to 8 carbon atoms and a substance selected from the group consisting of the hypochlorites of alkali metals and alkaline earth metals and maintaining a pH of between 6.0 and 8.0.

4. The method for preparing an alkylhypochlorite comprising introducing carbon dioxide into an aqueous solution containing a water soluble aliphatic alcohol and a substance selected from the group consisting of the hypochlorites of alkali metals and alkaline earth metals and maintaining a pH of between 6.0 and 8.0.

5. The method for preparing an alkylhypochlorite comprising introducing carbon dioxide into an aqueous solution having pH between 6.0 and 8.0 and having dissolved therein an aliphatic alcohol having from 1 to 8 carbon atoms and a substance selected from the group consisting of the hypochlorites of alkali metals and alkaline earth metals.

6. The method of claim 5 in which said $CO_2$ is introduced as a solid.

7. The method of claim 5 in which said $CO_2$ is introduced as a liquid.

8. The method of claim 5 in which said $CO_2$ is introduced as a gas.

9. The method of claim 5 in which said hypochlorite is that of an alkali metal.

10. The method of claim 5 in which said hypochlorite is that of an alkaline earth metal.

No references cited.